N. F. Guffin.
Hop Trellis.
N° 65,214. Patented May 28, 1867.
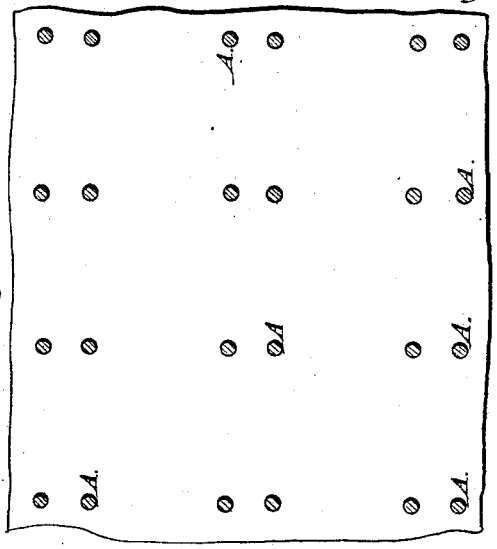
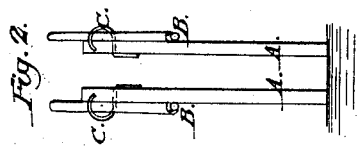
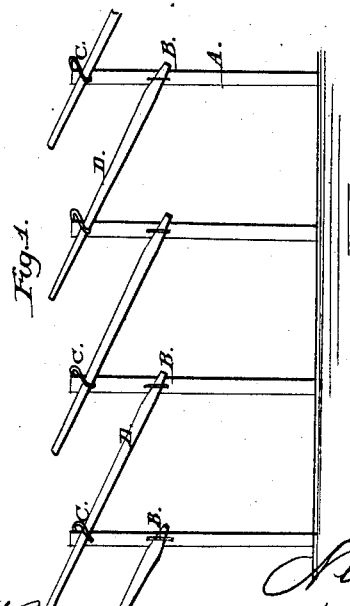
Witnesses:
Chas. F. Clausen
Lawrence Murphy
Inventor:
Newell F. Guffin
D. P. Holleway & Co.
Attorneys.

United States Patent Office.

NEWELL F. GUFFIN, OF GROVENORS CORNERS, NEW YORK.

Letters Patent No. 65,214, dated May 28, 1867.

HOP-TRELLIS.

The Schedule referred to in these Letters Patent and making part of the same.

TO ALL WHOM IT MAY CONCERN:

Be it known that I, NEWELL F. GUFFIN, of Grovenors Corners, in the county of Schoharie, and State of New York, have invented a new and useful improvement in Trellises for Training Hop-Vines; and I do hereby declare that the following is a full, clear, and exact description of the same, reference being had to the annexed drawings making part of this specification, in which—

Figure 1 is a side elevation.

Figure 2 is a view had from the end of one of the rows; and

Figure 3 is a plan.

The same letters are employed in all the figures in the indication of the same parts.

A A are the vertical stakes, set firmly in the ground in two parallel rows, at suitable distances apart to permit the growth of the vines and the requisite circulation of air. To these stakes, on the outside of each row, is attached a loop or hook, C, of wire, or other suitable material, and below that is placed, on the same side, an eye or staple, B. D D are transverse poles, tapering at the lower end for convenient insertion into the eyes B, and to form a shoulder to support the pole and prevent its slipping through the eye. The other end of the pole is supported by the hook or loop C on the top of the next pole A in the row. The poles are thus interlocked continuously through the entire extent of the row. The vines are to be planted at the foot of the poles A, and on climbing the pole to the inclined transverse pole B they will follow that, and thus have a much greater length than can be given to them without using vertical poles of very inconvenient length. In gathering the hops it will be only necessary to cut the vines at the base of the transverse poles D, which may then be carried with the vines on them to the pickers.

What I claim as my invention, and desire to secure by Letters Patent, is—

The combination of the poles A planted in double parallel rows, and the transverse inclined poles D interlocking the former, to which they are attached by hooks or loops C and eyes B, substantially as and for the purpose set forth.

In testimony whereof I have signed my name to this specification in the presence of two subscribing witnesses.

NEWELL F. GUFFIN.

Witnesses:
 JOHN L. LORD,
 CATHARINE LORD.